United States Patent [19]

Cameron

[11] Patent Number: 4,512,525
[45] Date of Patent: Apr. 23, 1985

[54] CONE TYPE ROCK CRUSHER AND BEARING ARRANGEMENT THEREFOR

[75] Inventor: Robert W. Cameron, Canton, Ohio

[73] Assignee: The Timken Company, Canton, Ohio

[21] Appl. No.: 25,992

[22] Filed: Apr. 2, 1979

[51] Int. Cl.³ .............................................. B02C 2/04
[52] U.S. Cl. .................................................... 241/207
[58] Field of Search .................................. 241/207–216

[56] References Cited

U.S. PATENT DOCUMENTS

| | | | |
|---|---|---|---|
| 2,791,383 | 5/1957 | Kjelgaard | 241/207 X |
| 3,811,626 | 5/1974 | Kemnitz | 241/214 |
| 3,887,143 | 6/1975 | Gilbert et al. | 241/215 |
| 3,908,915 | 9/1975 | Milenkouic | 241/216 X |

Primary Examiner—Mark Rosenbaum
Attorney, Agent, or Firm—Gravely, Lieder & Woodruff

[57] ABSTRACT

A cone-type rock crusher includes a base, a fixed shaft projected upwardly from the base, a rotatable member positioned around the fixed shaft, a generally conical crusher head positioned over the rotatable member, and a stationary crushing surface over the head. The rotatable member revolves on a first set of bearings including a tapered roller thrust bearing between the top of the shaft and the rotatable member, a tapered roller radial bearing between the side of the shaft and the rotatable member, and a much larger tapered roller bearing between the side of the rotatable member and a carrier that is fixed in position with respect to the base. Both radial bearings have their tapered rollers arranged in a single row with the large diameter ends of those rollers presented downwardly to facilitate seating the rollers and to permit easy assembly and disassembly. The head is mounted on the rotatable member by a second set of bearings having its axis oblique to the axis of the first set so that as the rotatable member revolves, the head will wobble beneath the stationary crushing surface. The second set of bearings includes a large tapered roller bearing located between the side of the intermediate member and the head, and this bearing transmits thrust as well as radial loads from the head to the rotatable member. It further has its rollers arranged in a single row with their large diameter ends presented downwardly to permit easy seating and disassembly.

19 Claims, 1 Drawing Figure

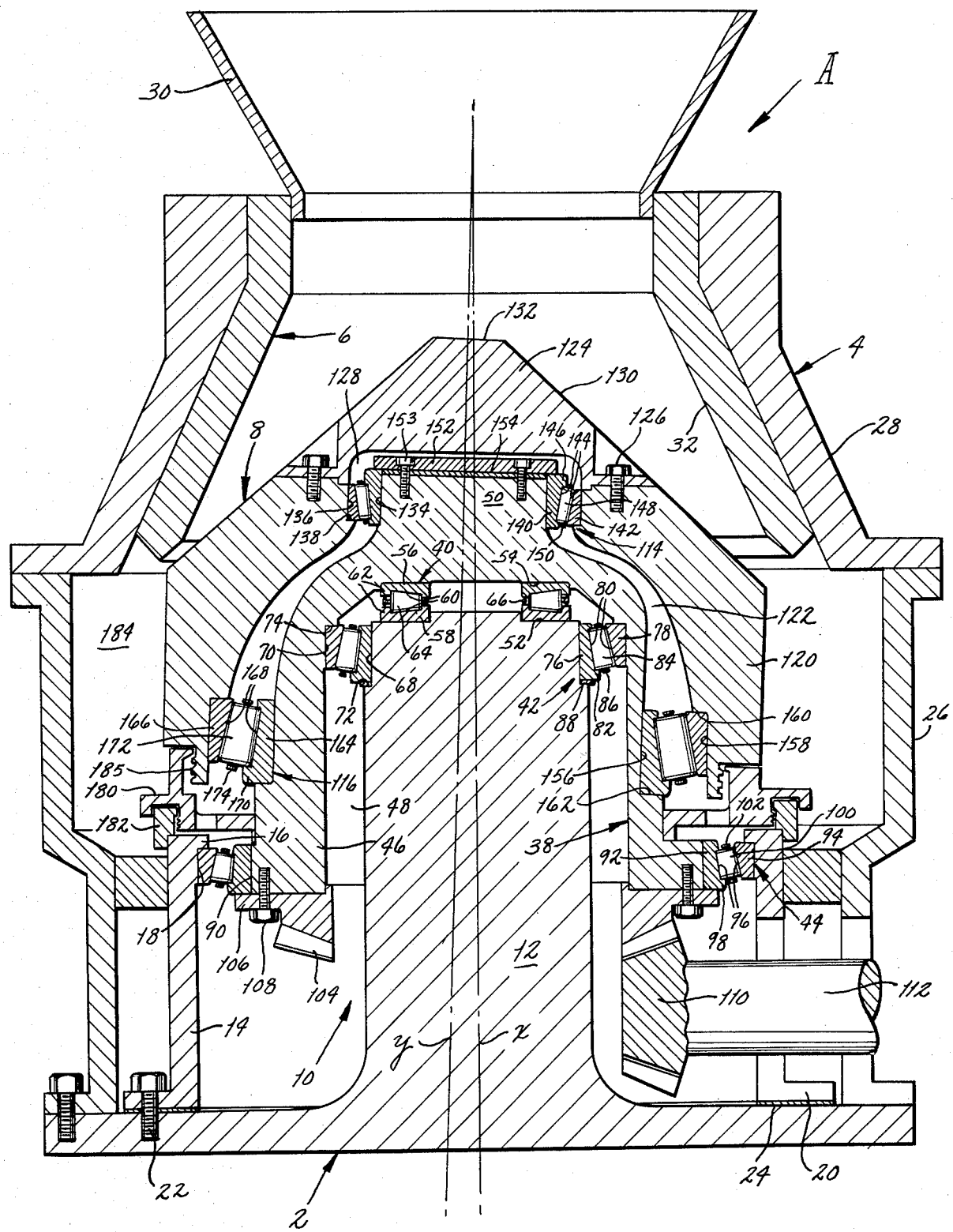

CONE TYPE ROCK CRUSHER AND BEARING ARRANGEMENT THEREFOR

BACKGROUND OF THE INVENTION

This invention relates in general to crushing machines and more particularly to a cone-type crusher and a bearing arrangement for such a crusher.

The typical cone-type rock crusher has a fixed conical surface that flares outwardly from a hopper, and located opposite to this surface is a conical crushing head which is mounted on an eccentric shaft. The arrangement is such that when the shaft revolves, the head undergoes a wobbling gyratory motion opposite the fixed conical surface, and as a consequence the space between any point on the fixed surface and the head continually expands and contracts. Thus, rock from the hopper will enter the space as it opens, and this rock is crushed as the space closes. Furthermore, the space tapers downwardly toward the periphery of the fixed conical surface so that the rock particles become progressively smaller as they move outwardly away from the hopper.

Since the rock is in effect wedged between the fixed conical surface and the crusher head as the head gyrates, heavy radial and thrust loads are imposed on the head, and these loads are transmitted to the eccentric shaft and to the frame of the machine through bearings. In the larger machines, the bearings take the form of cylindrical roller bearings oriented to accommodate both the radial and thrust loads. These bearing assemblies are in themselves quite massive, often having as many as six rows of cylindrical rollers. Moreover, they are especially constructed for such rock crushers, and as such are quite expensive. Inasmuch as they utilize cylindrical rollers at thrust locations they are incapable of providing pure rolling contact at these locations, so some skidding does occur along the thrust raceways, all to the detriment of the bearing. Furthermore, cylindrical roller bearings are incapable of being adjusted so that the wear in the bearings results in ever increasing lateral free motion for the head, a condition that is not desirable.

Some smaller machines utilize tapered roller bearings between the crusher head and the eccentric shaft, and likewise between the shaft and the machine frame, but present bearing arrangements of this nature are not altogether satisfactory. For example, while such bearings are capable of being adjusted against each other to remove all end and radial play, the adjustments are not easily made because of the size and orientation of the bearings. More specifically, the tapered rollers at some locations tend, by virtue of their own weight, to move away from a properly seated position with respect to their raceways, and as a consequence, it is difficult to bring them into a properly seated position. Also, tapered roller bearings when mounted in pairs are capable of taking thrust loading in both axial directions as well as radial loading, and therefore when compared with cylindrical roller bearings, fewer of them are needed for the crusher head and the eccentric shaft. However, the spread between the bearings of each pair must be relatively large to accommodate thrust couples, and this results in a machine of extended length.

SUMMARY OF THE INVENTION

One of the principal objects of the present invention is to provide a cone-type rock crusher that utilizes tapered roller bearings to support the crusher head and the member which causes it to undergo a gyratory motion. Another object is to provide a bearing arrangement for a crusher of the type stated, with the bearings of the arrangement being conventional tapered roller bearings that are relatively inexpensive in comparison to specially designed bearings. A further object is to provide a bearing arrangement of the type stated which is easily adjusted to eliminate radial and end play and to compensate for wear in the bearings. An additional object is to provide a bearing arrangement and crusher of the type stated which are highly compact, yet afford substantial spreads between opposed pairs of tapered roller bearings to accommodate the couples or moments applied to the crusher head. Still another object is to provide a bearing arrangement of the type stated which is suitable for large crushing machines. These and other objects and advantages will become apparent hereinafter.

The present invention is embodied in a crusher having a base, and a fixed member projected upwardly from the base. An intermediate member surrounds the base, it being carried by first bearing means which enable the intermediate member to rotate about a first axis. A crusher head is positioned generally around the intermediate member, it being carried on second bearing means which enable the intermediate member to rotate within it, but the axis of the second bearing means is oblique to the axis of the first bearing means, and accordingly the crusher head wobbles in a gyratory manner when the intermediate member rotates. The crusher also has a housing that encloses the crusher head and also has an opening as well as a downwardly presented crushing surface that is located opposite the crushing surface of the head. Thus, as the head wobbles, the space between it and any point on the crushing surface of the housing will alternately expand and contract. Material which enters this space when expanded will accordingly be crushed when the space contracts. The invention also consists in the parts and in the arrangements and combinations of parts hereinafter described and claimed.

DESCRIPTION OF THE DRAWING

In the accompanying drawing which forms part of the specification and wherein like numerals and letters refer to like parts wherever they occur, the single FIGURE is a sectional view of a crusher constructed in accordance with and embodying the present invention.

DETAILED DESCRIPTION

Referring now to the drawings, A designates a cone-type rock crusher that basically includes a base 2, a housing 4 extending upwardly from the base 2, a conical liner 6 in the upper end of the housing 4, a crusher head 8 directly below liner 6, and an assembly 10 for supporting the crusher head 8 within the housing and for further enabling it to undergo a wobbling gyratory motion below the liner 6. This motion causes the space between the head 8 and any given point on the liner 6 to alternately expand and contract. Rocks migrate into this space when it is expanded, and if they are too large for the space when it contracts, they are crushed between the liner 6 and the head 8.

The base 2 is usually mounted on a solid foundation, but in the case of portable units it may be supported on the bed of a vehicle such as a truck trailer. It extends outwardly and underlies the entire housing 4 which is attached to it. Extending upwardly from the base 2 is a large center shaft 12 which constitutes part of the assembly 10 for supporting the crusher head 8. The axis X of the shaft 12 forms the center axis of the crusher A. The shaft 12 is anchored firmly to the base 2 and may even be cast integral with it. The base 2 should rest upon its foundation such that the center axis X of the shaft 12 is as close to vertical as possible.

The base 2 also supports an annular bearing carrier 14 that surrounds the shaft 12 and is concentric to it. At its upper end the carrier 14 is provided with an inwardly directed lip 16, and immediately below the lip 16 it has a machined bore 18. At its lower end the carrier 14 has an outwardly directed flange 20 which is secured to the base 2 by machine screws 22. The height of the carrier 14 on which the base is controlled by shims 24 which are interposed between the flange 20 and the base 2.

The housing 4 is attached by screws to the base 2 and includes a side wall 26 that extends upwardly from the base 2 and surrounds both the center shaft 12 and the annular bearing carrier 14. The side wall 26 further surrounds the head 8 and is attached by screws to a top wall 28 which extends over the head 8, covering much of it, except for a portion at the center of the head 8. Here the top wall 28 is provided with an opening into which a hopper 30 opens.

The liner 6 is attached to the top wall 28 of the housing 4 such that it is for all intents and purposes fixed in position with respect to the base 2. It is formed from a very durable substance that is capable of withstanding repeated impacts without fracturing or undergoing excessive deformation. Manganese steel is suitable for this purpose. The liner 6 surrounds, but does not obstruct the lower end of the hopper 30, so that rock which is introduced into the hopper 30 gravitates into the expanding and contracting space between the liner 6 and the crusher head 8. This space is defined in part by a conical downwardly presented surface 32 on the underside of the liner 6.

The mechanism 10 for supporting the head 8, in addition to the center shaft 12, includes an eccentric intermediate member 38 that fits over the shaft 12, it being positioned on the shaft 12 by three bearings, namely a flat thrust bearing 40, an upper radial bearing 42 and a lower radial bearing 44, all of which are conventional tapered roller bearings. More specifically, the upper portion of the intermediate member 38, has a skirt 46 that surrounds a cavity 48 into which the center shaft 12 projects, with the side surface of this cavity being concentric to the axis X and spaced outwardly from the shaft 12. The skirt 46 merges into a stub shaft 50 which is considerably smaller in diameter than the skirt 46 and is located directly above the end of the fixed center shaft 12.

The shaft 12 and the intermediate member 38 have flat annular surfaces 52 and 54, respectively, that are located directly opposite each other with each being in a plane that is perpendicular to the axis X. The annular surfaces 52 and 54 are machined such that each is located along a short vertical wall that is concentric to the axis X. The flat thrust bearing 40 is located between the two annular surfaces 52 and 54 and includes an upper race 56 and a lower race 58, each of which is provided with a tapered raceway 60 and a thrust rib 62 along the periphery of its raceway 60. In addition, the bearing 40 has a single row of tapered rollers 64 located between and contacting the raceways 60 of the two races 56 and 58 and a cage 66 for maintaining the proper spacing between the rollers 64. The upper race 56 is positioned against the annular surface 54, while the lower race 58 is against the annular surfce 52, the arrangement being such that the vertical walls along these surfaces confine the bearing 40 and position it concentric to axis X of the shaft 12. The two raceways 60, being part of a tapered roller thrust bearing, will, if extended inwardly, intersect at the axis X. As a consequence, the rollers 64 experience pure rolling contact with the raceways 60, there being no skidding when the intermediate member 38 rotates on the shaft 12.

Directly below flat thrust bearing 60 the shaft 12 has another machined surface 68 which is located opposite to a machined bore 70 in the skirt 46 of the intermediate member 38. Both the surfaces 68 and the bore 70 are cylindrical and concentric with the axis X. Moreover, the surface 68 leads to a shoulder 72 on the shaft 12, while the bore 70 ends at a shoulder 74 in the skirt 46 of the intermediate member 38. The upper radial bearing 42 is located between the surface 68 and the surface of the bore 70 and includes a cone 76 that fits over the surface 68 with its back face presented downwardly toward the shoulder 72, and a cup 78 that fits into the bore 70 with its back face abutting the shoulder 74. The cone 76 and cup 78 have opposed tapered raceways 80, and the cone 76 further has a thrust rib 82 located at the large diameter end of its raceway 80. In addition, the bearing 42 includes a single row of tapered rollers 84 located between the two raceways 80 of the cone 76 and cup 78 and a cage 86 to maintain the proper spacing between the rollers 84. Fitted between the shoulder 72 and the back face of the cone 76 is a spacer 88 that determines the adjustment of the bearing 42 and that adjustment should place the bearing 42 in a condition of zero end play or even slight preload when the rollers 64 of the thrust bearing 40 are fully seated against the raceways 60. In effect, the thrust bearing 40 and upper radial bearing 42 are stacked, and the thickness of the spacer 88 should be such that the former takes most of the thrust load. An alternate location for spacer 88 would be between the race 58 and surface 52. Since the bearing 42 is a tapered roller bearing, its rollers 84, if extended to apexes will have those apexes located at a common point along the axis X. This insures that pure rolling contact will occur along the raceways 80.

At the lower end of its skirt 46 the intermediate member 38 is provided with a raised surface 90 which is machined concentric to the axis X and is located within the machined bore 18 of the bearing carrier 14. The lower radial bearing 44 fits between the raised surface 90 and the surface of the bore 18, and it includes a cone 92 that fits over the surface 90 on the skirt 46 and a cup 94 which fits into the machined bore 18 of the carrier 14. The cone 92 has its back face presented downwardly, while the cup 94 has its back face presented upwardly and in abutment with the lip 16 on the carrier 14. Both the cone 92 and cup 94 have tapered raceways 96, and the cone 92 further has a thrust rib 98 located at the large diameter end of its tapered raceway 96. In addition, the lower bearing 44 includes a single row of tapered rollers 100 located between the two raceways 96 and a cage 102 for maintaining the proper spacing between the rollers 100. The large diameter ends of the rollers 100 are positioned against the thrust rib 98 on the cone 92, the weight of the rollers 100 urging them into that position. The adjustment for the lower bearing 44 is controlled by the thickness of the shims 24 located between the base 2 and the flange 20 at the lower end of the bearing carrier 14. The adjustment should place the bearing 44 in a condition of zero end play or even slight preload. Since the bearing 44 is a conventional tapered roller bearing, its rollers 100 if extended to their individual apexes would have those apexes located at a common point along the axis X.

Thus, the three bearings 40, 42, and 44 enable the intermediate member to revolve with its axis of rotation being the axis X of the fixed center shaft 12. Any radial loading is taken by the upper and lower radial bearings 42 and 44, and these bearings likewise resist any couples. Thrust loading in the downward direction is accommodated primarily through the thrust bearing 40 and to a lesser extend through the upper radial bearing 42. The lower radial 44 bearing keeps the intermediate member 38 from lifting off of the shaft 12 and thereby takes any thrust forces that are directed upwardly.

Fitted against the lower end of the intermediate member 38 is a beveled ring gear 104 that has an axially directed lip which projects into the cavity 48 of the intermediate member 38 and thereby positions the ring gear 104 concentric to the axis X of rotation. In addition, the ring gear 104 has a flange 106 which projects outwardly beyond the raised surface 90 at the lower end of the skirt 46 and serves as a backing surface against which the back face of the cone 92 for the lower bearing 44 is positioned. Extended through the flange 106 are screws 108 which thread into the lower end of the intermediate member 38 and thereby secure the ring gear 104 firmly to the intermediate member 38. The ring gear 104 meshes with a beveled pinion gear 110 that is located on the end of a drive shaft 112 that extends at right angles to the axis X of the center shaft 12. Indeed, the drive shaft 112 passes through an opening in the bearing carrier 14 and another opening in the housing 4, beyond which it is coupled with an electric or other motor (not shown) for turning the same. Of course, when the motor is energized, the shaft 112 rotates and turns the intermediate member 38, causing the latter to revolve about the center axis X of the fixed center shaft 12.

The crusher head 8 fits over the intermediate member 38 and is supported on it by indirectly mounted tapered roller bearings 114 and 116, both of which are of conventional manufacture. The bearing 116 is the larger of the two, and indeed insofar as the four radial bearings are concerned, it has the greatest thrust carrying capability. The head 8 includes a main body 120 that extends from the stub shaft 50 downwardly along the major portion of the skirt 46 for the intermediate member 38. The body has a downwardly opening cavity 122 that is configured to receive the portions of the intermediate member 38 over which it fits. In addition, the head 8 has a cap 124 that is secured to the upper end of the main body 120 by screws 126, and this cap 124 has a downwardly opening cavity 128 that opens into the cavity 122 of the main body 120. Both the main body 120 and the cap 124 have conical upwardly presented surfaces which are flush so as to provide a continuous conical surface 130 on the head 8. This conical surface 130 is presented upwardly and located opposite to the conical surface 32 on the liner 6. Its taper is less than the taper of the conical surface 32 on the liner 6 so that the space between the two surfaces 32 and 130 becomes progressively smaller toward the peripheries of the surfaces 32 and 130. The conical surface 130 on the cap 124 does not extend to an apex, but instead runs out to a flat upwardly presented surface 132 that is located directly under the hopper 30. Both the cap 124 and the main body 120 are preferably cast from a durable substance which will withstand repeated impacts without fracturing or undergoing significant deformation. Manganese steel is suitable for this purpose.

The stub shaft 50 on the intermediate member 38 is provided with a machined surface 134 that is located within a bore 136 which is machined into the main body 120 of the head 8 and terminates at an upwardly presented shoulder 138. Both the surface 134 and the bore 136 are concentric to an axis Y which is located at a slight angle with respect to the center axis X. The upper tapered roller bearing 114 includes a cone 140 that fits around the surface 134 on the stub shaft 50, and a cup 142 that fits into the surface 136 on the main body 120 of the head 8. The cone 140 has its back face presented upwardly, whereas the cup 142 has it back face presented downwardly against the shoulder 138 on the main body 120. Moreover, both the cone 140 and cup 42 have tapered raceways 144, with the cone 140 further having a thrust rib 146 that is presented upwardly. In addition, the bearing 114 includes a single row of tapered rollers 148 positioned between the two raceways 144 and a cage 150 for maintaining the proper spacing between the rollers 148. The cone 140 of the upper bearing 114 is held in place by an end plate 152 that is secured to the upper end of the stub shaft 50 by screws 153 and projects outwardly therefrom to bear against the back face of the cone 140. Between the end plate 152 and stub shaft 50 are shims 154, and the thickness of these shims determines the adjustment of the two bearings 114 and 116.

At its lower end, the skirt 46 of the intermediate member 38 is provided with another machined surface 156 which is located within another bore 158 that is machined into the lower end of the main body 120 for the head 8. Both the surface 156 and the bore 158 are concentric to the oblique axis Y. The surface 156 extends down to an upwardly presented shoulder 162 on the skirt 46 of the intermediate member 38, whereas the bore 158 ends at a downwardly presented shoulder 160 in the main body 120 of the head 8.

The lower bearing 116 fits over the surface 156 and within the bore 158 and is considerably larger than the upper bearing 114, both in terms of diameter and roller size. It includes a cone 164 that fits around the surface 156 on the skirt 46 with its back face presented downwardly against the shoulder 162. It also includes a cup 166 that fits into the bore 158 in the main body 120 and has its back face located against the shoulder 160 at the end of the surface 158. Both the cone 164 and cup 166 have tapered raceways 168 that are located opposite each other, and the cone 164 further has a thrust rib 170 that is positioned at the large diameter end of its raceway 168. Between the two raceways 168 is a single row of tapered rollers 172 and a cage 174 for maintaining the proper spacing between the rollers 172. The rollers 172 have their large diameter ends against the thrust rib 170 on the cone 164, their own weight tending to urge them to that position. If extended to their individual apexes, the rollers 172 would have those apexes located at a common point along the oblique axis Y inasmuch as the bearing 116 is a tapered roller bearing. The adjustment of the bearings 114 and 116 is controlled by the thickness of the shims 154 located at the upper end of the stub shaft 50 on the intermediate member 38, and that adjustment should be such that the bearings 114 and 116 are in a condition of zero end play or slight preload.

The main body 120 of the head 8 at its lower end is provided with a labyrinth ring 185 which cooperates with a seal ring 180 that fits around the skirt 46 on the intermediate member 38. The seal ring 180, in turn, overlies a stationary ring 182 that is attached to the upper end of the bearing carrier 14 and in effect creates a labyrinth with that ring. The arrangement is such that rocks and fines are excluded from the vicinity of the bearings 40, 42, 44, 114, and 116.

The side wall 26 of housing 4 in the vicinity of the labyrinth ring 180 is provided with a collection chamber 184 in which the crushed material collects. This material is withdrawn through apertures (not shown) in the side wall 26. Finally, the crusher A includes a restraining device (not shown) for retarding rotation of the head 8 when the intermediate member 38 revolves within it, yet does not prevent the head 8 from undergoing the gyratory wobbling motion. This may take the form of a conventional antispin motor or a linkage extended between the housing 4 and the head 8.

All fits between the cones 76, 92, 140 and 164 of the four radial bearings 42, 44, 114 and 116 and their respective machined surfaces 68, 90, 134, and 156 over which those cones fit are interference fits. Likewise, interference fits exist between the cups 78, 94, 142, and 166 and the respective faces 70, 18, 136 and 158, into which they fit.

To assemble the rock crusher A, a spacer 88 of proper thickness is selected and installed over the machined surface 68 at the upper end of the fixed center shaft 12. The spacer 88 drops downwardly and rests against the shoulder 72 at the lower end of the surface 78, its thickness being determined from measurements made on the center shaft 12, the intermediate member 38, and also on the two bearings 40 and 42. That thickness should be such that the thrust bearing 40 will carry the major portion of the thrust load, yet the upper radial bearing 42 will be in a condition of zero end play or even slight preload.

Once the spacer 88 is selected and installed over the center shaft 12, the lower race 58 along with the rollers 64 and cage 66 of the flat thrust bearing 40 are installed on the flat surface 52 at the upper end of the shaft 12. Likewise, the cone assembly for the upper radial bearing 42 is installed at the upper end of the shaft 12, that assembly including the cone 76, the tapered rollers 84, and the cage 86. Indeed, the cone 76 is heated enough to expand over the surface 68 and moved downwardly until its backface comes against the spacer 88.

In addition to the foregoing, the cup 94 of the lower radial bearing 44 is pressed or shrunk into bore 18 of the bearing carrier 14 until its backface comes to rest against the inwardly directed lip 16. Similarly, the upper race of the flat thrust bearing 40 is installed in the intermediate member 38 against the flat angular surface 54, while the cup 78 of the upper angular bearing 42 is pressed into the bore 70 until its backface comes against the shoulder 74. Then the cone assembly for the large bearing 116 is fitted over the skirt 46, and that cone assembly includes not only the cone 164, but also the tapered rollers 172 and the cage 174 which surround the cone 164. In particular, the cone 164 is pressed downwardly over the machined surface 156 until it comes to rest against the shoulder 162.

With the foregoing components in place, the intermediate member 38 is lowered over the center shaft 12 until the member 38 is supported entirely by the bearings 40 and 42. When this occurs, the rollers 64 of the flat thrust bearing 40 will be seated properly against the tapered raceways 60 on the two races 56 and 58, and likewise the rollers 84 will be seated against the raceways 80 of the cone 76 and cup 78 for the upper radial bearing 42. The latter bearing presents no difficulty inasmuch as the rollers 84, by virtue of their own weight, and the weight of intermediate member 38 tend to lie along the thrust rib 82 which is the position they assume when properly seated. In other words, it is not necessary to oscillate the intermediate member 38 while subjecting it to a relatively heavy load in order to work the tapered rollers 84 into a proper-seated condition in the bearing 42.

Next the bearing carrier 14 is lowered over the intermediate member 38 until the tapered raceway 96 for the cup 94 that is within it comes into contact and seats against the tapered rollers 100. Again the rollers 100 lie against the thrust rib 98 of the bearing 44 since gravity urges them to that position, or in other words they are already in the position which will enable them to seat properly against the raceways 96. Shims 24 are selected and installed between the base 2 and the outwardly directed flange 20 of the carrier 14, those shims being thick enough to place the lower radial bearing 44 in a condition of either zero end play or slight preload. This is a relatively simple procedure involving nothing more than measuring the gap between the flange 20 and the base 2. Once the screws 22 are run down and tightened, the 3 bearings 40, 42, and 44 are all properly adjusted with respect to each other, and they enable the intermediate member 38 to rotate on the center shaft 12 about the axis X.

After the intermediate member 38 is mounted on the center shaft, the head 8 is installed on the intermediate member. First the cups 142 and 166 for the bearings 114 and 116 are installed in their respective bores 136 and 158, these cups 142 and 166 being pressed through the bores 136 and 158 until their backfaces come against the respective shoulders 138 and 160. Thereupon, the main body 120 of the head 8 is lowered downwardly over the intermediate member 38 until it is supported entirely by the bearing 116. In this condition the tapered raceway 168 of the cup 166 seats against the rollers 172 forcing the rollers 172 to in turn seat against the tapered raceway of the cone 164. The weight of the rollers 172 and the weight of the main body 120 causes rollers 172 to lie against the thrust rib 170 of the core 164, a position which enables them to properly seat against the raceways 168 of the cone 164 and cup 166. Thereafter, the cone assembly of the other tapered roller bearing 114 is fitted over the stub shaft 50 and advanced downwardly until the tapered rollers 148 seat against the tapered raceways 144 of the cone 140 and cup 142. Then, the thickness for the shim 154 is measured, but before this measurement is made, care should be exercised to insure that the large diameter ends of the tapered rollers 148 are against the thrust rib 146 of the cone 140. This might require oscillating the intermediate member 38 or main body 120 slightly while the bearing 116 is under thrust load so as to cause the rollers 148 to work upwardly against the thrust rib 146. In any event, once the shim thickness is determined, the shims 154 are installed, and thereafter the end plate 152 is clamped down with screws 153 against the shim 154 and the backface of the cone 140.

To complete the head 8, the cap 124 is clamped down onto the main body 120 with the screws 126. Finally, the housing 4, including the liner 6 which is within it, is installed over the head 8 and the bearing carrier 14 to complete the assembly procedure. After periods of extended service, compensation for bearing wear can be easily made at crusher overhaul by altering the thickness of spacer 88, shims 24, and shims 154 during reassembly.

OPERATION

In operation, the drive shaft 112 is driven by a suitable motor and it, in turn, through the meshing beveled gears 104 and 110, or other suitable drive means which may involve gears, chains, or belts, rotates the intermediate member 38, causing the member 38 to revolve on its three bearings 40, 42, and 44 about the axis X of the center shaft 12. Even though the crusher head 8 is supported on the intermediate member 38, it does not rotate appreciably for it is slowed against rotation by the restraining device. As a consequence, the intermediate member 38 rotates within the head 8, and this rotation is accommodated by the bearings 114 and 116. Since the axis Y of the bearings 114 and 116 is oblique to the axis X of rotation for the intermediate member 38, the head 8 wobbles within the liner 6. This wobbling motion is such that at any given point along the liner 6 the space between the head 8 and the liner 6 alternately expands and contracts.

When rock is introduced into the hopper 30 it migrates into the space between the liner 6 and head 8 when the space opens. Then as the space closes, the rock is crushed between the conical surfaces 32 and 130 on the liner 6 and head 8, respectively. Moreover, the two conical surfaces 32 and 130 converge toward the outer peripheries of the head 8 and liner 6 so that as rock particles move along those surfaces they become progressively smaller, eventually being reduced to at least the size of the space between the outer periphery of the liner 6 and the outer periphery of the head 8 when that space is at its smallest.

In lieu of mounting the bearings 114 and 116 in the indirect configuration, the upper bearing 114 may be inverted so that it too transfers the downwardly directed thrust load to the intermediate member. This stacked arrangement however does not permit the two bearings 114 and 116 to be adjusted against each other, but depends on the weight of the head 8 and the external crushing forces to keep the bearings properly seated.

This invention is intended to cover all changes and modifications of the example of the invention herein chosen for purposes of the disclosure which do not constitute departures from the spirit and scope of the invention.

What is claimed is:

1. A crusher comprising: a base; a fixed member projected upwardly from the base and being fixed in position with respect to the base; an intermediate member surrounding the fixed member; first bearing means for enabling the intermediate member to rotate with respect to the fixed member about the axis of the first bearing means, the first bearing means including a thrust bearing located at the upper end of the fixed member where it is between the fixed member and the intermediate member so as to transmit thrust loads from the intermediate member to the fixed member, the first bearing means also including a tapered roller radial bearing surrounding the fixed member near the thrust bearing and being located between the side of the fixed member and the intermediate member, so as to transfer radial loads from the intermediate member to the fixed member, the radial bearing having a single row of tapered rollers with the large diameter ends of the tapered rollers being presented downwardly, the tapered roller radial bearing further being positioned to also transmit some of the thrust load from the intermediate member to the fixed member; means for rotating the intermediate member; a crusher head positioned generally around the intermediate member, the crusher head having an upwardly presented crushing surface; second bearing means between the crusher head and the intermediate member to enable the intermediate member to rotate within crusher head, the axis of the second bearing means being oblique to the axis of the first bearing means, whereby the head will wobble as the intermediate member rotates; a housing extending over the head, the housing having an inlet located above the head so that material to be crushed may be directed through the opening and toward the head; and a downwardly presented crushing surface located in a generally fixed position within the housing, the crushing surface of the housing being positioned opposite to, yet spaced from, the crushing surface on the head, so that material introduced into the housing through the opening will be crushed in the space between the two crushing surfaces as the crusher head wobbles.

2. A crusher according to claim 1 wherein the intermediate member also extends over the fixed member, and the crusher head also extends over the intermediate member.

3. A crusher according to claim 1 wherein the second bearing means comprises a pair of tapered roller bearings.

4. A crusher according to claim 2 wherein the intermediate member includes a skirt that surrounds the fixed member and a stub shaft projecting upwardly from the skirt and being smaller in diameter than the skirt; and wherein the second bearing means includes a lower tapered roller bearing surrounding the skirt and an upper bearing surrounding the stub shaft, the lower tapered roller bearing having a single row of tapered rollers with those tapered rollers having their large diameter ends presented downwardly.

5. A crusher according to claim 1 wherein the thrust bearing includes a row of tapered rollers.

6. A crusher according to claim 1 wherein the tapered roller radial bearing of the first bearing means is adjusted with respect to the thrust bearing such that it is in a condition of zero end play or slight preload.

7. A crusher according to claim 1 wherein the second bearing means includes a tapered roller radial bearing that surrounds the intermediate member below the thrust bearing and is located within the crusher head, the tapered roller bearing of the second bearing means having its tapered rollers arranged in a single row with the large diameter ends of the rollers being presented downwardly, the tapered roller bearing of the second bearing means further being configured and positioned to transfer downwardly directed thrust loads from the crusher head to the intermediate member.

8. A crusher according to claim 1 and further comprising a bearing carrier surrounding the intermediate member and being mounted in a fixed position with respect to the base; and wherein the first bearing means further comprises a radial bearing surrounding the intermediate member and located between the intermediate member and the bearing carrier for transmitting radial loads from the intermediate member to the bearing carrier.

9. A crusher according to claim 8 wherein the radial bearing that is located between the intermediate member and the carrier is a single row tapered roller bearing having the large diameter ends of its tapered rollers presented downwardly.

10. A crusher according to claim 9 wherein the carrier is adjustable upwardly and downwardly with respect to the base to alter the adjustment of the tapered roller bearing that is between the intermediate member and the carrier.

11. A crusher according to claim 1 wherein the inside diameter of the tapered roller radial bearing surrounding the fixed member is greater than the outside diameter for the thrust bearing.

12. A crusher comprising: a base; a center shaft fixed firmly to and projected upwardly from the base; an intermediate member extended over and surrounding the center shaft; a bearing carrier normally fixed in position with respect to the base and surrounding the intermediate member; a thrust bearing between the upper end of the center shaft and the intermediate member to take thrust loading applied to the intermediate member, a first tapered roller bearing between the side of the shaft and the intermediate member to take radial loading applied to the intermediate member, the first bearing having a single row of tapered rollers with the large diameter ends of the rollers being presented downwardly; a second tapered roller bearing surrounding the intermediate member and located between the intermediate member and the bearing carrier, the second bearing having a single row of tapered rollers with the large diameter ends of the rollers being presented downwardly; the second bearing having its axis common with the axis of the thrust bearing and the first bearing, whereby the thrust and the first and second bearings enable the intermediate member to rotate on the fixed shaft about the axis of the bearings; means for rotating the intermediate member; a crusher head extended around and over the intermediate member and having a generally conical upwardly presented surface; bearing means between the intermediate member and crusher head to enable the intermediate member to rotate relative to the crusher head, the axis of the bearing means being inclined slightly with respect to the common axis of the thrust, first and second bearings, whereby the crusher head will wobble as the intermediate member revolves within it; a housing enclosing the crusher head and having an inlet opening located generally over the crusher head; and a generally conical crushing surface located within the housing so as to be over and spaced from the conical crushing surface on the head, the crushing surface of the housing being generally fixed in position with respect to the base, whereby as the crusher head wobbles the space between it and any point on the crushing surface of the housing will alternately enlarge and contract so that material within the space will be crushed.

13. A crusher according to claim 12 wherein the second bearing means comprises a lower tapered roller bearing and an upper bearing, both of which surround the intermediate member and are located within the crusher head, the tapered rollers of the lower bearing being presented downwardly.

14. A crusher according to claim 12 wherein the bearing carrier is adjustable upwardly and downwardly on the base so that the second bearing may be adjusted.

15. A crusher comprising: a base including an upwardly presented shaft; a rotatable member supported on the base around the shaft; a bearing carrier mounted in a normally fixed position with respect to the base and generally around the rotatable member; first bearing means for enabling the rotatable member to rotate relative to the base about an axis that is fixed in position with respect to the base and extends through the shaft, the first bearing means including a single row tapered roller bearing that surrounds the rotatable member and is located between the rotatable member and the bearing carrier, with the large diameter ends of its tapered rollers being presented downwardly; means for rotating the rotatable member; a crusher head positioned generally around and over the rotatable member, the crusher head having an upwardly presented crushing surface; second bearing means between the crusher head and the rotatable member for supporting the crusher head on the rotatable member and for enabling the rotatable member to rotate within crusher head, the axis of the second bearing means being oblique to the fixed axis of the first bearing means, whereby the head will wobble as the rotatable member rotates; a housing extending over the head, the housing having an inlet located above the head so that material to be crushed may be directed through the opening and toward the head; and a downwardly presented crushing surface located in a generally fixed position within the housing, the crushing surface of the housing being positioned opposite to, yet spaced from, the crushing surface on the head, so that material which is introduced into the housing through the opening will be crushed in the space between the two crushing surfaces as the crusher head wobbles.

16. A crusher according to claim 15 wherein the bearing carrier is separate from the base and may be moved upwardly or downwardly on the base to adjust the single row tapered roller bearing of the first bearing means.

17. A crusher according to claim 15 wherein the first bearing means supports the rotatable member on the shaft and includes at least one bearing between the shaft and the intermediate member.

18. A crusher according to claim 17 wherein the first bearing means includes a thrust bearing between the shaft and the intermediate member.

19. A crusher according to claim 15 wherein the second bearing means includes a single row tapered roller bearing positioned between the rotatable member and the crusher head with the large diameter ends of its rollers being presented downwardly.

* * * * *